United States Patent
Bimboes et al.

(10) Patent No.: US 6,434,953 B2
(45) Date of Patent: Aug. 20, 2002

(54) FILLING DEVICE FOR MOTOR VEHICLE AIR-CONDITIONING SYSTEMS

(75) Inventors: Herbert Bimboes, Filderstadt; Harald Raiser, Balingen; Wolfgang Schmidt, Plochingen; Michael Sickelmann, Stuttgart, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/817,222

(22) Filed: Mar. 27, 2001

(30) Foreign Application Priority Data

Mar. 30, 2000 (DE) ......................... 100 15 976

(51) Int. Cl.⁷ ............................... F25B 45/00
(52) U.S. Cl. ..................... 62/77; 62/292; 62/149
(58) Field of Search ....................... 62/77, 292, 149, 62/475, 195, 174, 126, 127, 470

(56) References Cited

U.S. PATENT DOCUMENTS

| 4,261,178 A | 4/1981 | Cain ........................... 62/149 |
| 4,470,265 A | 9/1984 | Correia ........................ 62/77 |
| 4,513,578 A | * 4/1985 | Proctor et al. ............... 62/149 |
| 4,624,112 A | 11/1986 | Proctor ....................... 62/149 |
| 4,688,388 A | 8/1987 | Lower et al. ................. 62/126 |
| 4,884,410 A | 12/1989 | Bell et al. .................... 62/77 |
| 5,076,063 A | 12/1991 | Kamegasawa et al. ....... 62/48.2 |
| 5,325,675 A | * 7/1994 | Manz et al. ................... 62/77 |
| 5,375,426 A | 12/1994 | Burgener ...................... 62/85 |
| 5,406,806 A | 4/1995 | Ricketts et al. ............... 62/149 |
| 5,999,700 A | 12/1999 | Geers ........................... 392/441 |
| 6,138,462 A | * 10/2000 | Murray et al. ................ 62/149 |

FOREIGN PATENT DOCUMENTS

| DE | 39 03 045 | 8/1990 |
| DE | 689 04 753 | 6/1993 |
| DE | 43 31 769 | 3/1995 |
| EP | 0 315 296 | 2/1993 |
| WO | 81/00756 | 3/1981 |

* cited by examiner

Primary Examiner—Chen-Wen Jiang
(74) Attorney, Agent, or Firm—Foley & Lardner

(57) ABSTRACT

The invention relates to a filling device for motor vehicle air-conditioning systems which can be operated with harmless and natural refrigerants, in particular $CO_2$. The filling device is to have a high safety standard, while at the same time being simple to operate and having a cost-effective makeup. For this purpose, the filling device comprises a connection (12) for connecting the device (10) to the air-conditioning system, a drainage line (18), containing a drainage valve (24), for draining off the refrigerant of the air-conditioning system in a defined manner, a pumping-off line (20) which has a pump (36) and is connected to the connection (12), for completely pumping off refrigerant residues and any other impurities, and a refrigerant feed line (22), connected to the connection (12), for filling the air-conditioning system with refrigerant from a refrigerant reservoir (44).

32 Claims, 1 Drawing Sheet

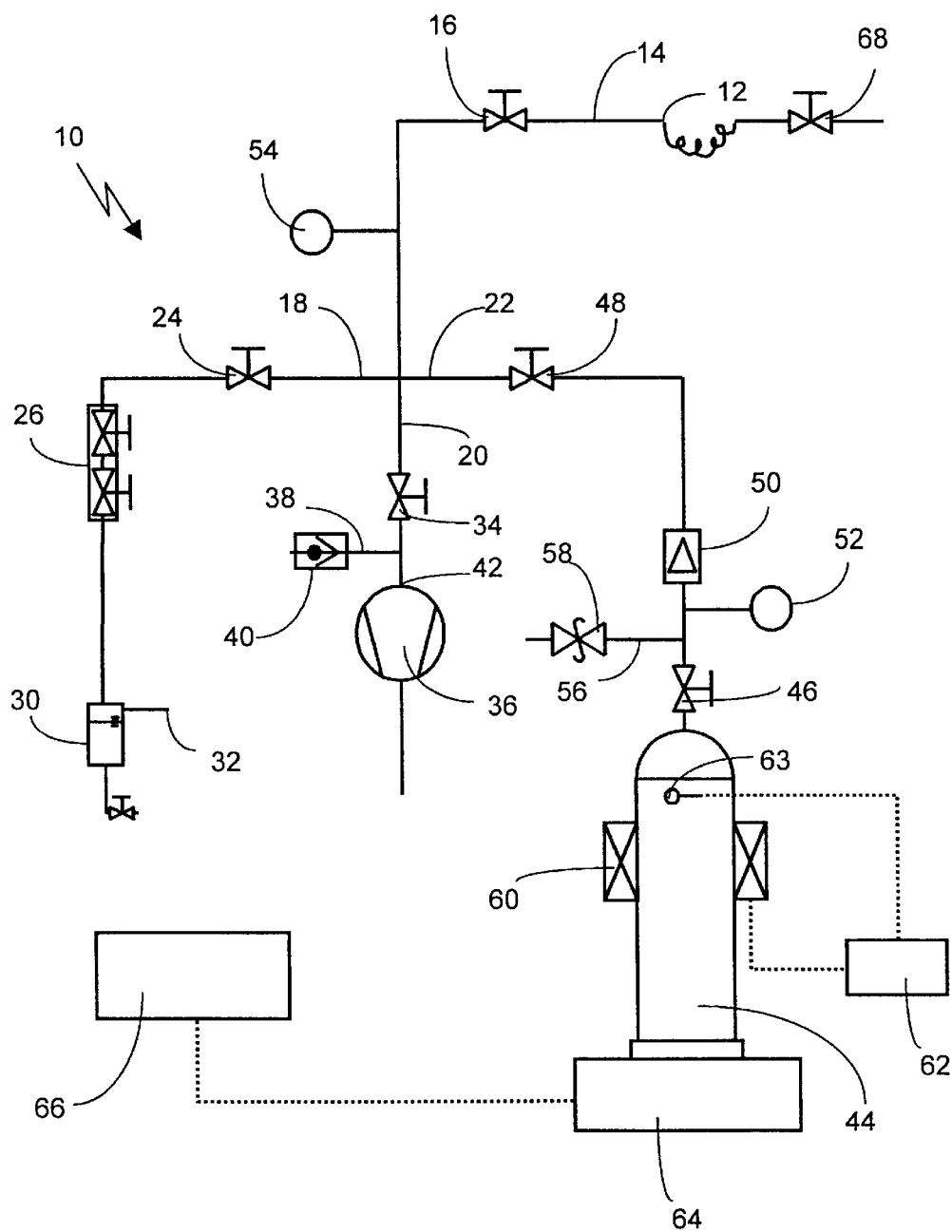

FILLING DEVICE FOR MOTOR VEHICLE AIR-CONDITIONING SYSTEMS

BACKGROUND OF THE INVENTION

The invention relates to a filling device for motor vehicle air-conditioning systems, which is required for the maintenance of air-conditioning systems in order to exchange old spent refrigerant for new refrigerant.

EP 0 315 296 B1 discloses a refrigerant recovery system, by means of which refrigerant can be extracted from an air-conditioning system, purified and fed to the air-conditioning system again. This known refrigerant recovery system is suitable for air-conditioning systems which are operated with the refrigerants R12 or R134a. These refrigerants, because of their hydrocarbon content, are extremely harmful to the environment and should not be discharged into the environment, and it is therefore necessary to have a refrigerant recovery system of this type with a multiplicity of components, such as an evaporator, condenser, compressor and various valves, and with a complicated makeup.

A refrigerant recovery system of this type is not necessary or expedient for air-conditioning systems which contain harmless and natural refrigerants, for example, $CO_2$.

One object of the present invention, therefore, is to provide a filling device for a motor vehicle air-conditioning system that uses harmless refrigerants, in particular $CO_2$, which has a simple makeup and is correspondingly cost-effective and which meets a high safety standard.

Another object of the invention is to provide a method for draining and filling an air-conditioning system.

SUMMARY OF THE INVENTION

In accomplishing the objects of the invention, there has been provided according to one aspect of the invention, a filling device for a motor vehicle air-conditioning system comprising:

(a) a connection for connecting the device to the air-conditioning system;
(b) a drainage line, comprising a drainage valve, for draining off the refrigerant of the air-conditioning system at a predetermined rate;
(c) a pumping-off line which comprises a pump and is connected to the connection, for pumping off refrigerant residues substantially completely; and
(d) a refrigerant feed line, connected to the connection, for filling the air-conditioning system with refrigerant from a refrigerant source.

According to another aspect of the present invention, there is provided a draining and filling device for motor vehicle air-conditioning system comprising:

(a) a connector for connecting the filling device to a motor vehicle air conditioning system;
(b) a connecting line connected to said connector, said line comprising:
   (i) a drainage line for draining off refrigerant from said motor vehicle air conditioning system;
   (ii) a pumping-off line for pumping off refrigerant residues from said motor vehicle air conditioning system, and
   (iii) a refrigerant feed line for filling said motor vehicle air conditioning system with refrigerant;
(c) a refrigerant outlet arranged at the end of said drainage line for discharging drained off refrigerant into the surroundings;
(d) a refrigerant reservoir connected to said line via said refrigerant feed line;
(e) a heater for heating said refrigerant reservoir and refrigerant contained therein; and
(f) a weighing device on which said refrigerant reservoir is mounted.

According to still another aspect of the present invention, there is provided a method of draining and filling a motor vehicle air-conditioning system comprising:

(a) connecting a connector of a filling device to a filling valve of said motor vehicle air conditioning system; closing a third shutoff valve; opening the filling valve as well as a first shutoff valve, a second shutoff valve and a fourth shutoff valve;
b) establishing refrigerant throughflow via said connector through a device for reducing pressure; discharging old refrigerant exiting from said device via an oil separator into the atmosphere;
c) pumping off substantially all refrigerant, moisture or dirt remaining in the motor vehicle air-conditioning system via said connector;
d) setting a filling pressure as a function of temperature and content of a refrigerant filling reservoir;
e) heating said refrigerant filling reservoir;
f) filling said motor vehicle air-conditioning system with refrigerant via said connector; and
g) separating said draining and filling device from said motor vehicle air-conditioning system.

Further objects, features and advantages of the invention will become apparent from the detailed description of preferred embodiments that follows, when considered together with the accompanying drawing.

BRIEF DESCRIPTION OF THE DRAWINGS

The FIGURE shows a schematic block diagram of the filling device according to the invention.

DETAILED DESCRIPTION OF THE PREFERRED EMBODIMENTS

According to the invention, the filling device has only one connection for connecting the device to the air-conditioning system, with essentially three lines branching off from the connection. The first line is designed as a drainage line and contains a drainage valve, by means of which the refrigerant, in particular $CO_2$, can be drained off in a defined manner. A defined slow drainage of the refrigerant is particularly important in $CO_2$ air-conditioning systems, since, if the $CO_2$ were drained off in an uncontrolled way, the polymers, for example seals, used in the air-conditioning system could be damaged. A second line is designed as a pumping-off line having a pump, by means of which moisture, dirt and residual filling quantities of the $CO_2$ can be pumped off from the air-conditioning system completely, so that the air-conditioning system can then be filled with fresh $CO_2$ via a feed line. The $CO_2$ is provided in a commercially available refrigerant reservoir.

The filling device according to the invention offers a high safety standard, has a simple and correspondingly cost-effective makeup and can therefore be operated in a simple way even by unskilled personnel.

In a refinement of the invention, an oil separator is provided in the drainage line, so that, when the refrigerator oil co-transported by the $CO_2$ is being drained off, this oil is not discharged into the environment, but can be collected and disposed of.

In order to ensure a defined rate of drainage of the $CO_2$, a pressure reducer is provided in the drainage line, so that the $CO_2$ can be drained off at a predetermined mass or volume flow rate.

So that the fresh $CO_2$ filling pressure can be set reliably, a pressure gage is provided in the feed line.

To enable reaching the necessary filling pressures, the refrigerant reservoir has heating means by which the $CO_2$ present in the reservoir can be heated, so that the air-conditioning system can be filled at the appropriate pressure, for example 70 bar. In order to assure that the heating power does not become too high, thus resulting in an excessively high pressure which could cause damage to the air-conditioning system, a safety circuit for limiting the heating power is provided.

In a motor vehicle air-conditioning system with $CO_2$ as refrigerant, a defined quantity of $CO_2$ must be introduced, while the tolerance of ±10 grams should not be exceeded. In order that these tolerance limits can be adhered to, a balance is provided, by means of which the refrigerant quantity extracted from the reservoir can be determined exactly.

In a further refinement of the invention, the pump, for emptying the air-conditioning system completely, is designed as a vacuum pump, by means of which the gaseous $CO_2$ can be pumped off and a defined vacuum can be generated in the lines and components of the refrigerating circuit, so that a leakage test can also be carried out on the refrigerating circuit. When a vacuum is being generated, the $CO_2$ dissolved in the refrigerator oil is also expelled from the oil and pumped off. The vacuum generated serves additionally for dehumidifying the refrigerating circuit.

To simplify the operating capability, a control apparatus for controlling all the components of the filling device, such as the valves, the heating means, the balance, etc., is provided, by means of which the individual components can be activated centrally. All the essential operations, such as the defined drainage of the refrigerant, the generation of the vacuum in the refrigerating circuit, the checking and setting of the filling pressure and the defined filling of the air-conditioning system with a defined quantity of refrigerant with a defined mass flow, can thereby be automated.

To ensure that the individual lines can withstand the high pressures which may arise, they should consist preferably of steel or aluminum.

Maximum flexibility of use is advantageous, and to this end, the entire filling device is accommodated in a housing and is designed to be transportable. This may be implemented in a known way, for example, by means of rollers on the housing.

The invention is explained in detail below by means of an exemplary embodiment with reference to the drawing. The single figure of the drawing shows a schematic block diagram of the filling device according to the invention and is merely exemplary of the invention.

A filling device 10 according to the invention has a connection 12 for connecting the filling device 10 to a motor vehicle air-conditioning system. The connection 12 has connected to it a line 14 which can be shut off via a first shutoff valve 16 and which is divided into a drainage line 18, a pumping-off line 20 and a refrigerant feed line 22.

The drainage line 18 has a second shutoff valve 24, a device for reducing the pressure 26 and an oil separator 30 in a series connection. Arranged at the end of the drainage line 18 is a refrigerant outlet 32, via which drained-off refrigerant can be discharged into the surroundings.

The pumping-off line 20 has a third shutoff valve 34 and a following vacuum pump 36. Between the shutoff valve 34 and the vacuum pump 36, a safety line 38 branches off, in which a nonreturn valve is arranged, so that, when large quantities of refrigerant appear at the inlet 40 of the vacuum pump 36, they do not have to be removed completely via the vacuum pump 36, but can be discharged into the surroundings via the safety line 38 and the nonreturn valve 40.

The refrigerant feed line 22 connects the line 14 to a refrigerant reservoir 44, in which the refrigerant, in particular $CO_2$, to be introduced into the air-conditioning system is provided. For safety reasons, commercially available liquid-gas bottles with a riser are used as reservoir 44. The reservoir 44 can be cut off via a gas-bottle valve 46. The feed line 22 can likewise be shut off via a fourth shutoff valve 48. When the valves 46, 48 and 16 are opened in order to fill the air-conditioning system, a throttle device 50 prevents refrigerant from flowing too quickly out of the reservoir 44 into the line system of the filling device 10. The filling pressure of the air-conditioning system is set as a function of the temperature and of the refrigerant quantity present in the reservoir 44 and can be read off on pressure gages 52 and 54 provided in the line 14 and the feed line 22. In order to cause refrigerant to flow out of the reservoir 44, the operating pressure in the reservoir 44 must always be higher than the pressure currently prevailing in the refrigerating circuit. In order, as required, to generate the operating pressures necessary for this purpose in the reservoir, the refrigerant reservoir 44 has heating means 60, by which the refrigerant reservoir and therefore the refrigerant located in it can be heated.

The heating power can be regulated via an electronic regulating circuit, so that the corresponding operating pressure is reached in the reservoir and the heating means 60 is regulated to a lower setting when the pressures are too high. Furthermore, a mechanical safety cutout 62 is provided, having a temperature sensor 63 which is arranged on the reservoir 44 and which is connected to the safety cutout via a capillary tube. When the safety limit temperature is reached, the supply of electricity to the heating means 60 is interrupted.

A second safety line 56, which can be opened via a safety valve 58, branches off from the feed line 22. In an emergency, the safety valve 58 can also be opened by hand, when the pressure in the feed line 22 is too high for unknown reasons.

The refrigerant reservoir 44 is mounted on a weighing device, such as balance 64, so that an exactly determinable refrigerant quantity can be extracted from the refrigerant reservoir 44 via an indicator and control apparatus 66 of the balance 64. Other conventional devices for measuring quantity of refrigerant supplied to the air-conditioning system can be employed instead, including flow measuring devices.

The motor vehicle air-conditioning system is filled according to the following method steps:

In the first place, the filling device 10 is connected with its connection 12 to a filling valve 68 of the motor vehicle air-conditioning system which is arranged on the vehicle. The third shutoff valve 34 is closed, the filling valve 68 and also the first, second and fourth shutoff valves 16, 24 and 48 are opened, and refrigerant is fed to the device for reducing the pressure 26 in such a way that a desired throughflow is established. Old refrigerant can then be discharged slowly via the oil separator 30 into the atmosphere in a defined manner via the outlet 32. When the pressure in the air-conditioning system and in the lines of the filling device 10 has fallen to ambient pressure and therefore the throughflow through the drainage line 18 has fallen to zero, the second shutoff valve 24 is closed, the vacuum pump 36 is started, and the third shutoff valve 34 is opened, so that the remaining refrigerant and any other moisture and dirt are then pumped off from the air-conditioning system via the pumping-off line 20.

After the remaining refrigerant has been pumped off from the air-conditioning system, the third shutoff valve 34 and the filling valve 68 are closed and the gas-bottle valve 46 is opened. A specific filling pressure is then set as a function of the temperature and content of the reservoir 44. In order to reach the filling pressure, the refrigerant reservoir 44 may, if appropriate, be heated via the heating means 60. The indicator 66 of the balance 64 has previously been read off, so that it is possible to determine the refrigerant extracted from the refrigerant reservoir 44. Refrigerant then flows from the refrigerant reservoir 44 into the line system of the filling device 10. The refrigerating circuit of the air-conditioning system is filled by opening the filling valve 68 on the vehicle in a controlled way.

After the prescribed refrigerant quantity is reached, the filling valve 68 is closed. The refrigerant quantity introduced corresponds to the decrease in weight of the reservoir 44. The refrigerant in the line system of the filling device 10 is discharged into the surroundings by the gas-bottle valve 46 being closed and by the second shutoff valve 24 being opened. The filling device 10 can subsequently be separated from the refrigerating circuit.

The entire emptying and filling operation may take place automatically by means of a conventional control apparatus, not illustrated in any more detail, as already described initially. For this purpose, advantageously, the refrigerant quantity to be introduced can be entered in the control apparatus, e.g. a microprocessor control system.

The disclosure of German Patent Application No. 100 15 976.1, filed Mar. 30, 2000, is hereby incorporated by reference in its entirety.

We claim:

1. A filling device for draining and filling refrigerant in an air-conditioning system comprising:
   (a) a connector for connecting the device to the air-conditioning system;
   (b) a connecting line connected to said connector, said connecting line comprising:
      (i) a drainage line, comprising a drainage valve, for draining off the refrigerant of the air-conditioning system at a predetermined rate;
      (ii) a pumping-off line which comprises a pump, for pumping off refrigerant residues substantially completely; and
      (iii) a refrigerant feed line for filling the air-conditioning system with refrigerant from a refrigerant source.

2. A filling device according to claim 1, wherein said drainage line further comprises an oil separator.

3. A filling device according to claim 1, wherein said drainage line further comprises a pressure reducer.

4. A filling device according to claim 1, wherein the feed line further comprises a pressure gage.

5. A filling device according to claim 1, further comprising a heater for heating the refrigerant supplied by the refrigerant source.

6. A filling device according to claim 5, wherein said heater comprises a mechanical safety cutout for reducing heating power if the temperature of the refrigerant exceeds a pre-determined temperature.

7. A filling device according to claim 5, wherein said filling device further comprises a device for determining the refrigerant quantity extracted from the refrigerant source.

8. A filling device according to claim 1, wherein said pump comprises a vacuum pump.

9. A filling device according claim 7, wherein said filling device further comprises a control system for controlling said valve, the heater and the refrigerant quantity determining device.

10. A filling device according to claim 1, wherein said lines comprise steel or aluminum.

11. A filling device according to claim 1, further comprising a common housing that is transportable.

12. A draining and filling device for a motor vehicle air-conditioning system comprising:
   (a) a connector for connecting the filling device to a motor vehicle air conditioning system;
   (b) a connecting line connected to said connector, said line comprising:
      (i) a drainage line for draining off refrigerant from said motor vehicle air conditioning system;
      (ii) a pumping-off line for pumping off refrigerant residues from said motor vehicle air conditioning system, and
      (iii) a refrigerant feed line for filling said motor vehicle air conditioning system with refrigerant;
   (c) a refrigerant outlet arranged at the end of said drainage line for discharging drained off refrigerant into the surroundings;
   (d) a refrigerant reservoir connected to said line via said refrigerant feed line;
   (e) a heater for heating said refrigerant reservoir and refrigerant contained therein; and
   (f) a weighing device on which said refrigerant reservoir is mounted.

13. A draining and filling device for a motor vehicle air-conditioning system according to claim 12, wherein said connecting line further comprises a first shut off valve.

14. A draining and filling device for a motor vehicle air-conditioning system according to claim 12, wherein said connecting line further comprises a pressure gage for indicating a filling pressure of the air conditioning system.

15. A draining and filling device for a motor vehicle air-conditioning system according to claim 12, wherein said drainage line further comprises:
   (a) a second shutoff valve;
   (b) a device for reducing pressure so that refrigerant can be drained off at a predetermined flow rate; and
   (c) an oil separator for separating oil from refrigerant that has been drained off and for collecting said oil.

16. A draining and filling device for a motor vehicle air-conditioning system according to claim 15, wherein said second shutoff valve, said device for reducing pressure and said oil separator are connected in series.

17. A draining and filling device for a motor vehicle air-conditioning system according to claim 12, wherein said pumping-off line further comprises:
   (a) a third shutoff valve;
   (b) a vacuum pump; and
   (c) a first safety vent arranged between said third shutoff valve and said vacuum pump.

18. A draining and filling device for a motor vehicle air-conditioning system according to claim 12, wherein said first safety vent further comprises a nonreturn valve arranged therein.

19. A draining and filling device for a motor vehicle air-conditioning system according to claim 12, wherein said said refrigerant feed line further comprises:
 (a) a fourth cutoff valve;
 (b) a throttle device for preventing refrigerants from flowing too quickly out of said reservoir into the line system of said filling device; and
 (c) a pressure gage for indicating a filling pressure of the air conditioning system.

20. A draining and filling device for a motor vehicle air-conditioning system according to claim 19, wherein said refrigerant feed line further comprises a second safety vent.

21. A draining and filling device for a motor vehicle air-conditioning system according to claim 20, wherein said second safety line further comprises a safety valve which can be opened by hand.

22. A draining and filling device for a motor vehicle air-conditioning system according to claim 12, wherein said refrigerant reservoir comprises a liquid-gas bottle and a gas-bottle cut off valve.

23. A draining and filling device for a motor vehicle air-conditioning system according to claim 12, wherein said heater further comprises an electronic regulating circuit.

24. A draining and filling device for a motor vehicle air-conditioning system according to claim 12, wherein said heater further comprises a mechanical safety cutout for interrupting the supply of electricity to the heater when a safety limit temperature is reached.

25. A draining and filling device for a motor vehicle air-conditioning system according to claim 24, wherein said mechanical safety cutout further comprises a temperature sensor connected to said safety cutout via a capillary tube and arranged on said refrigerant reservoir.

26. A draining and filling device for a motor vehicle air-conditioning system according to claim 12, wherein said weighing device comprises a balance.

27. A draining and filling device for a motor vehicle air-conditioning system according to claim 26, wherein said balance further comprises an indicator and control apparatus for metering an exact quantity of refrigerant for filling said motor vehicle air conditioning system.

28. A draining and filling device for a motor vehicle air-conditioning system according to claim 12, wherein said lines comprise steel or aluminum.

29. A draining and filling device for a motor vehicle air-conditioning system according to claim 12, wherein said device is contained within a common, transportable housing.

30. A method of draining and filling a motor vehicle air-conditioning system comprising:
 (a) connecting a connector of a filling device to a filling valve of said motor vehicle air conditioning system; closing a third shutoff valve; opening the filling valve as well as a first shutoff valve, a second shutoff valve and a fourth shutoff valve;
 (b) establishing refrigerant throughflow via said connector through a device for reducing pressure; discharging old refrigerant exiting from said device via an oil separator into the atmosphere;
 (c) pumping off substantially all refrigerant, moisture or dirt remaining in the motor vehicle air-conditioning system via said connector;
 (d) setting a filling pressure as a function of temperature and content of a refrigerant filling reservoir;
 (e) heating said refrigerant filling reservoir;
 (f) filling said motor vehicle air-conditioning system with refrigerant via said connector; and
 (g) separating said draining and filling device from said motor vehicle air-conditioning system.

31. A method of draining and filling a motor vehicle air-conditioning system according to claim 30, wherein said refrigerant is $CO_2$.

32. A method of draining and filling a motor vehicle air-conditioning system according to claim 30, further comprising, after step (c), performing a leakage test.

* * * * *